United States Patent [19]

Armel

[11] Patent Number: 5,442,162
[45] Date of Patent: Aug. 15, 1995

[54] TRAVELER'S CHECK AND DISPENSING SYSTEM THEREFOR

[75] Inventor: Jack Armel, Sarasota, Fla.

[73] Assignee: The Foundation For Physical Sciences, Sarasota, Fla.

[21] Appl. No.: 223,229

[22] Filed: Apr. 5, 1994

[51] Int. Cl.[6] .............................................. G06F 7/08
[52] U.S. Cl. .................................. 235/381; 235/380; 235/449; 235/487
[58] Field of Search ................. 235/380, 381, 487, 449

[56] References Cited

U.S. PATENT DOCUMENTS 4,777,108  10/1988  Adair ................................... 235/487
5,199,081  3/1993  Saito ..................................... 235/380

Primary Examiner—Harold Pitts
Attorney, Agent, or Firm—Gifford, Krass, Groh, Sprinkle, Patmore, Anderson & Citkowski

[57] ABSTRACT

An improved traveler's check issuable by a number of different institutions and substantially uniform in appearance. The traveler's check identifies on its face the individual customer to whom the check is issued. The individual identifying information includes a representation of the individual's portrait and signature and an account number, and appears on each traveler's check in a predetermined form and area. A system for issuing the improved traveler's checks includes: an identification imaging apparatus for recording the representation of the customer's portrait and signature, a central computer for storing recorded representations and customer account data, and a traveler's check dispenser through which checks may be issued upon proper request.

18 Claims, 7 Drawing Sheets

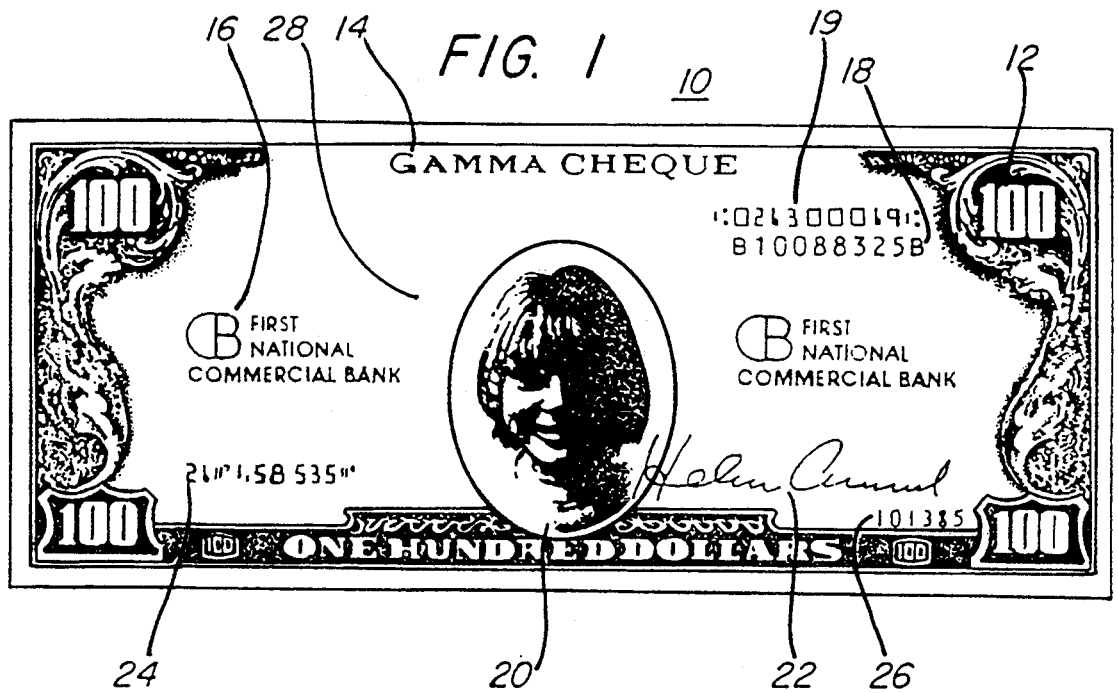
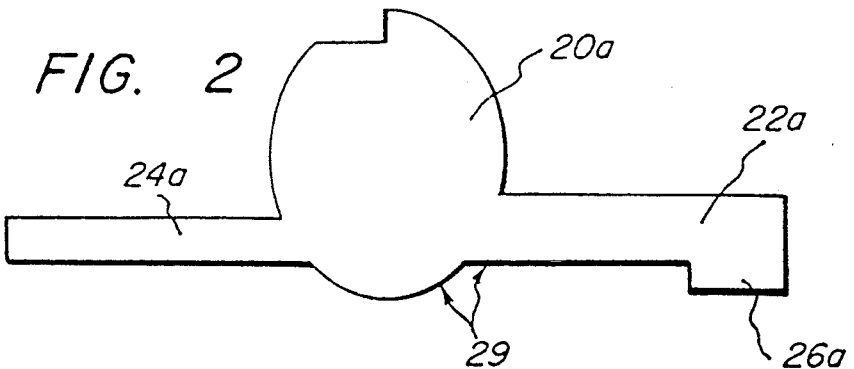
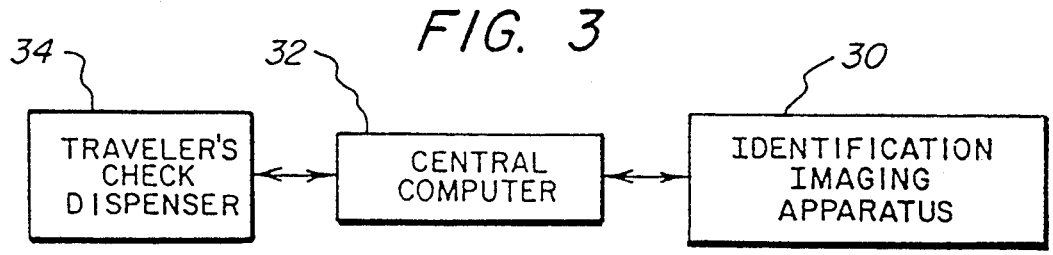

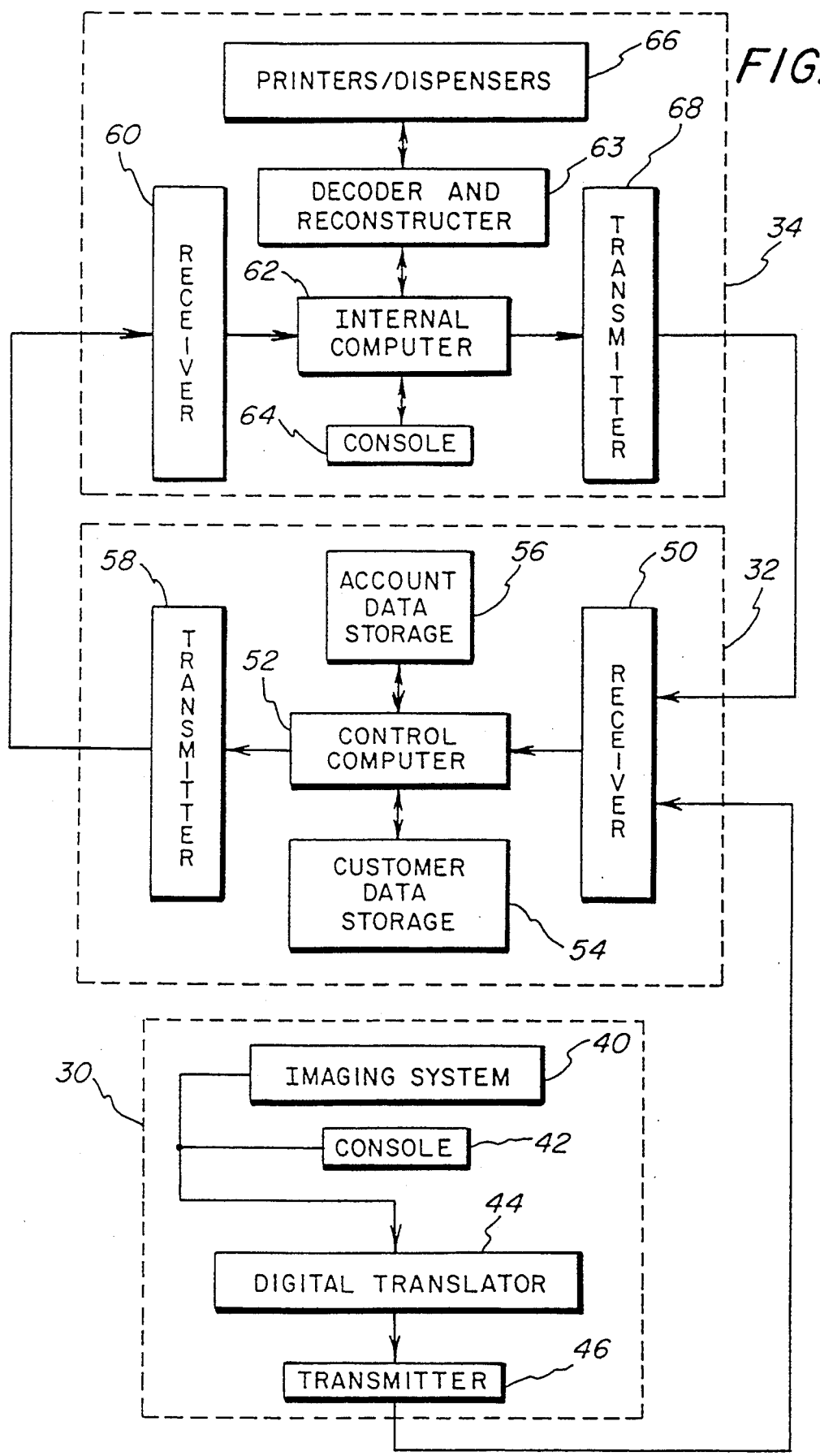

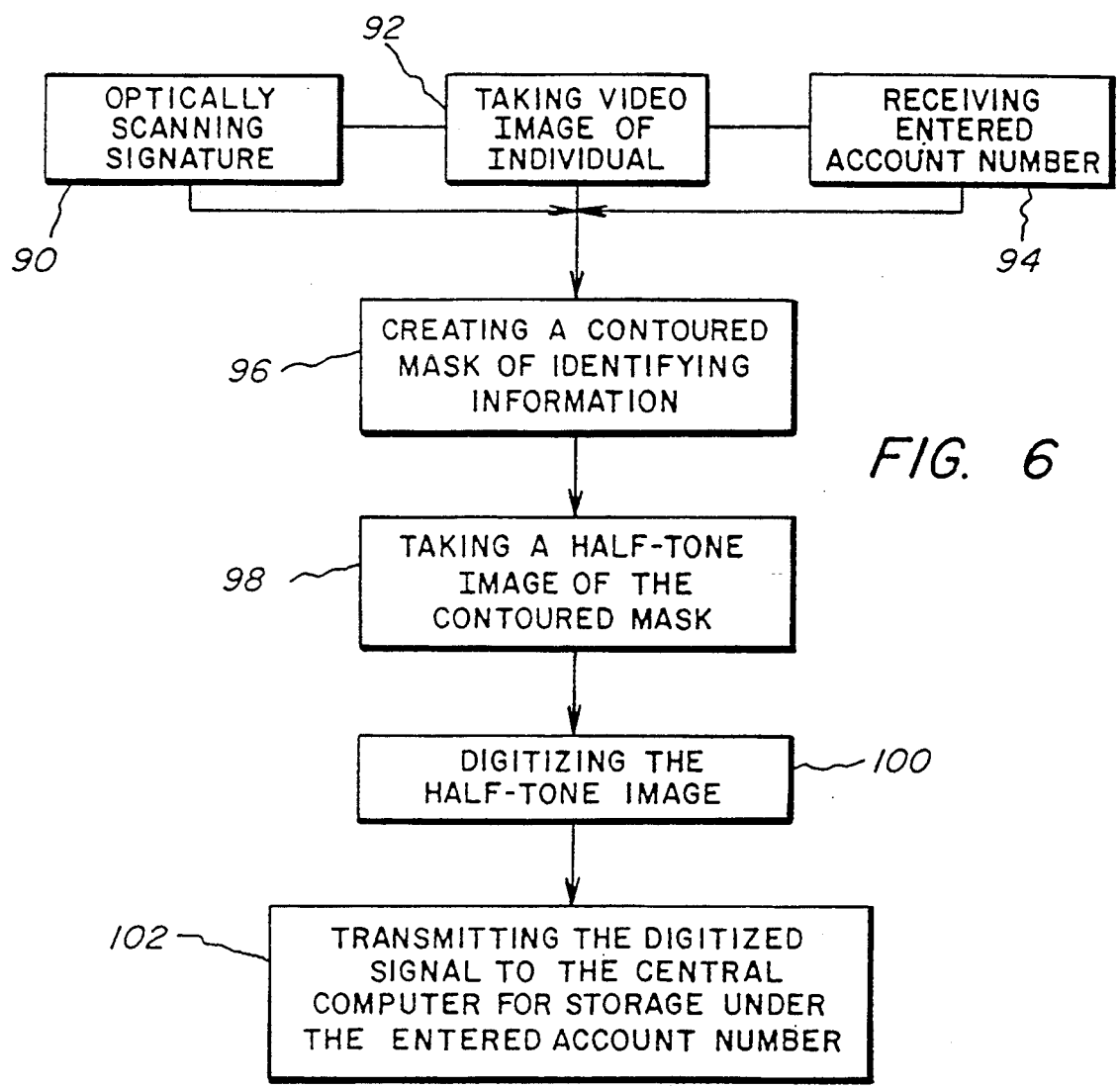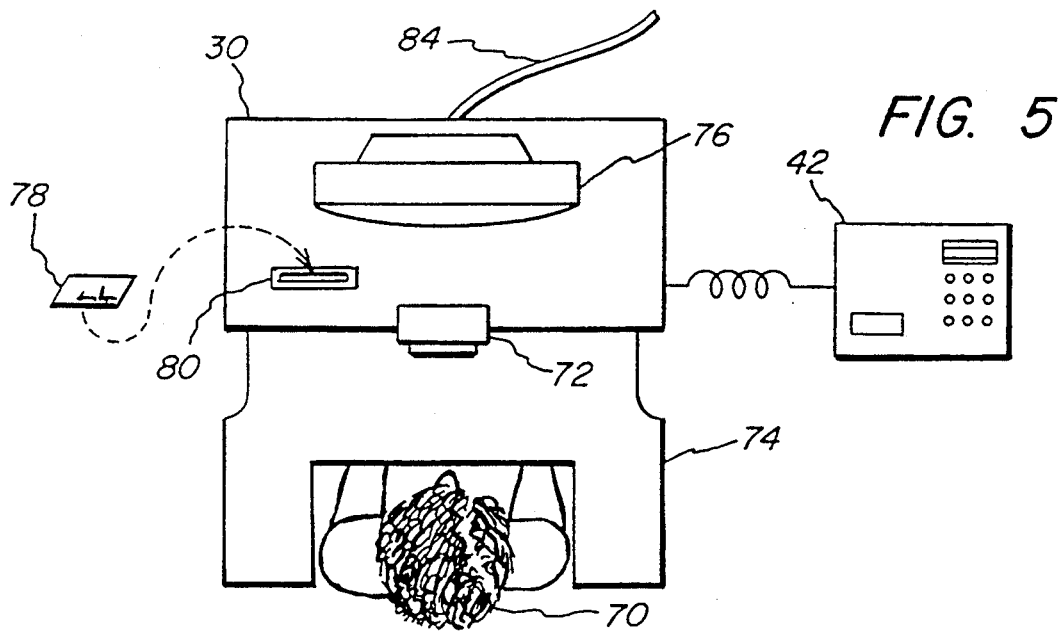

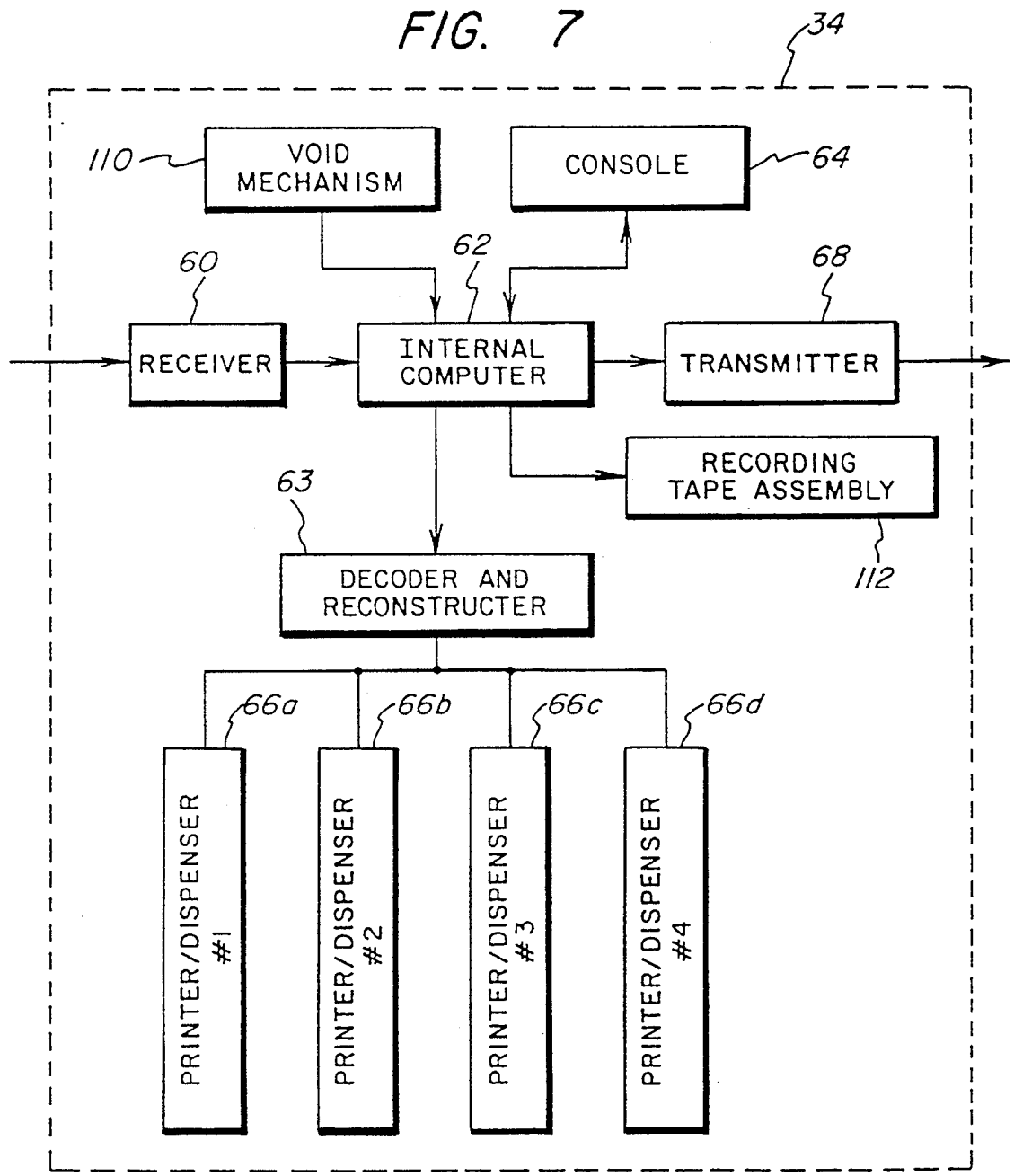

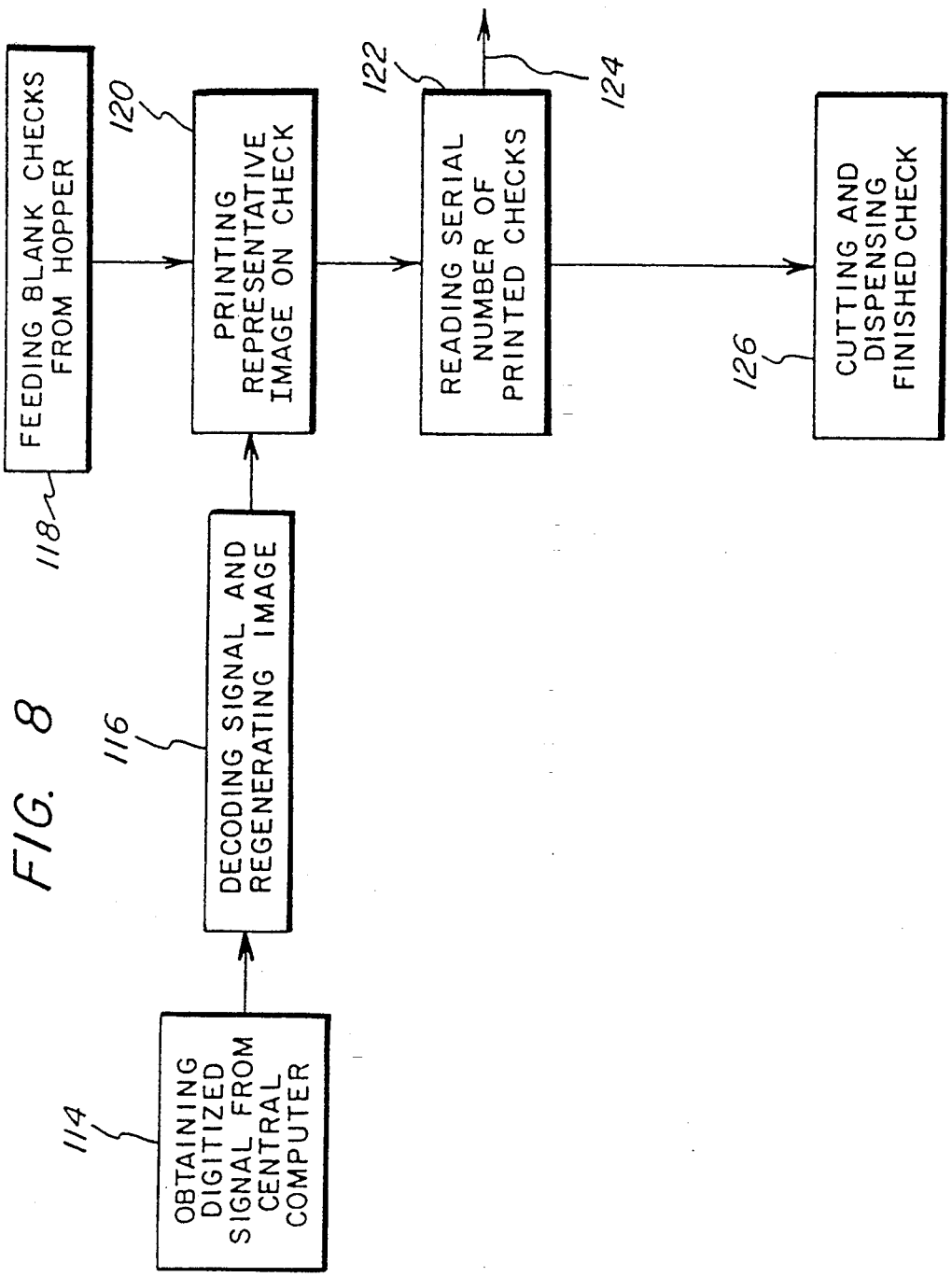

TRAVELER'S CHECK AND DISPENSING SYSTEM THEREFOR

Background of the Invention

1. Field of the Invention

The present invention relates in general to bank issued traveler's checks and more particularly to traveler's checks which identify on their face the individual customer to whom the checks are issued and systems for dispensing such checks.

2. Description of the Prior Art

Today, traveler's checks are primarily used, as the name implies, by individuals who expect to be away from home for an extended period of time. The institutions which issue traveler's checks generally have a large number of conveniently located redemption stations throughout the country and in some cases throughout the world. Traveler's checks allow an individual traveler to be secure in the knowledge that should his checks be lost or stolen, he would be able to easily obtain replacement checks at one of these redemption stations for no extra charge.

The business of issuing traveler's checks is very lucrative for those institutions involved. Over time, a large monetary "float" is created which provides issuing institutions with substantial profits from interest earned, while experience has proven traveler's checks carry a risk of loss to the issuing institutions of only about one percent.

There are problems, however, with traveler's checks as they presently exist. The lucrative business of issuing traveler's checks is in practice limited to a few large institutions. Only large institutions are able to obtain the recognition required before a traveler's check will be generally accepted and only such institutions are capable of providing the large network of redemption stations required in case checks are lost or stolen. In addition, as a necessary precaution against forgery, traditional traveler's checks have the undesirable feature of requiring an individual purchaser to sign each check at time of purchase and again at time of transfer. A traveler's check purchaser must also maintain a list containing the serial number of each check purchased along with which checks have been used and which remain should one or more of the remaining checks be lost or stolen.

Therefore,, there presently exists a genuine need for a universally recognizable traveler's check which allows small and medium sized banking institutions to partake in the business of issuing traveler's checks and which eliminates the inconvenience for a purchaser of having to sign each check when purchased, and of having to maintain a list containing the serial numbers of each check purchased along with which checks have been used and which remain.

SUMMARY OF THE INVENTION

Briefly, the present invention satisfies this need by providing universally recognizable traveler's checks which are issuable by a plurality of different institutions and which are substantially uniform in appearance. The traveler's checks of the present invention identify on their face the individual to whom, and preferably under whose account, the checks are issued. The identifying information includes a representation of the portrait and signature of the customer and his assigned account number. This information appears on each traveler's check in a predetermined form and area. Additionally, appropriate issuing bank identification and a serial number appear on the face of each check, and each check is preferably preprinted in a particular denomination.

The present invention also contemplates a dispensing system for issuing the traveler's checks which includes: an identification imaging apparatus, a central computer, and a traveler's check dispenser containing blank checks of particular denominations, preferably preprinted with the issuing bank's identification and a serial number. The identification imaging apparatus produces a representation of the portrait and signature of a bank customer for storage under an assigned account number in the bank's central computer. A bank account owner desiring to obtain traveler's checks preferably gives a bank teller his account number and a desired monetary amount and the teller enters the information into the check dispenser. The entered account number is then checked against assigned account numbers in the bank's central computer. If the comparison is favorable and proper payment is made, the check dispenser prints on the blank checks, in the desired monetary amount, the representation of the portrait and signature stored under the entered account number along with the entered account number, and the issue date. The present invention further contemplates for each check dispensed, the recordation and storage of the serial number, account number and issue date.

A primary object of the present invention is the provision of a universally recognizable traveler's check which will allow small and medium size banking institutions to partake in the lucrative business of issuing traveler's checks.

Another object of the present invention is the provision of a more secure traveler's check which identifies on its face the individual to whom the check is issued.

Yet another object of the present invention is the provision of a system for dispensing a traveler's check which has printed on its face a representation of the portrait and signature of the individual owner of an account number under which the check is issued.

Still another object of the present invention is the provision of such a dispensing system which records and stores under the individual's account number the amounts and serial numbers of dispensed checks and the issue date for easy verification and cancellation of checks subsequently lost or stolen.

A further object of the present invention is the provision of a system for dispensing traveler's checks which quickly and efficiently dispenses traveler's checks of different denominations totaling the monetary amount requested by the bank customer.

BRIEF DESCRIPTION OF THE DRAWINGS

For a more complete understanding of the present invention and the objects, advantages and benefits thereof, reference is now made to the following description taken in conjunction with the accompanying drawings in which:

FIG. 1 is a top plan view of the traveler's check of the present invention;

FIG. 2 is a contoured mask outline of the individual identifying information printed on each traveler's check of the present invention;

FIG. 3 is a block diagram of the main elements which comprise the dispensing system of the present invention;

FIG. 4 is a detailed block diagram of the elements shown in FIG. 3;

FIG. 5 is a top plan view of identification imaging apparatus useful in the present invention:

FIG. 6 is a block diagram of the steps implemented by the identification imaging apparatus;

FIG. 7 is a more detailed block diagram of the traveler's check dispenser shown in FIG. 4;

FIG. 8 is a block diagram of the steps implemented by the printer/dispenser shown in FIG. 7;

DETAILED DESCRIPTION OF THE INVENTION

Figure 9:
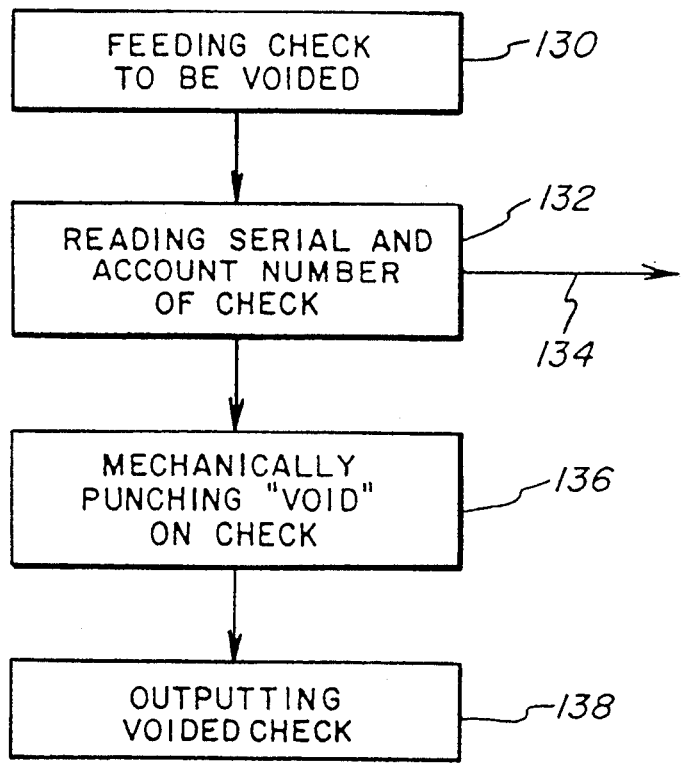
FIG. 9 is a block diagram of the steps implemented by the void mechanism shown in FIG. 7.

The face of one preferred embodiment of the universally recognizable traveler's check 10 of the present invention is shown in FIG. 1. In this embodiment, each traveler's check is of a specific preprinted denomination in United States dollars or foreign currency. For example, in FIG. 1 a traveler's check with a One Hundred Dollar denomination 12 is illustrated. Alternatively, the traveler's checks of the present invention may be of any desired monetary value.

Located on the face of each traveler's check 10 is appropriate issuing bank identifying information, such as the issuing bank's name and logo 16 and an identification number 19. Since it is contemplated that the traveler's checks of the present invention will be cleared through the existing banking system the same as any other Check, the issuing bank identification number 19 preferably includes an issuing branch number as a part thereof.

For recordation purposes, a serial number 18 appears on each traveler's check 10. The first digits of the serial number 18 will preferably correspond to the denomination value 12 of the traveler's check 10 as will be discussed below. A manufacturer of blank traveler's checks may include a trademark 14, e.g. "GAMMA CHEQUE" on the face thereof Central to the present invention is the inclusion on the traveler's check 10 of a representation of the portrait 20 and signature 22 of the individual bank customer, whether an individual account owner or a joint account owner, purchasing the check. Additionally, to facilitate recordation of the purchasing transaction and future identification of the check, an account number 24 belonging to the purchasing individual, or its coded equivalent, and an issue date 26 appear on the face of the check. In the case of joint account owners, an individual customer identifier, e.g. a suffix, to the joint account number 24 will preferably be included. All of this information preferably appears in a predetermined form and area on each traveler's check as will be discussed below.

In the embodiment of the present invention shown in FIG. 1, a Signature space 28 is provided on the face of the traveler's check wherein the individual transferring the traveler's check may sign his name. As a precaution against forgery, the embodiment illustrated is preferable since if the individual transferring the traveler's check is right handed, as most people are, his forearm will necessarily cover the signature facsimile 22 when he is signing his name in signature space 28, therefore eliminating the possibility of direct copying of the signature facsimile.

It may be observed that a party receiving the traveler's check 10 of the present invention may readily compare the portrait 20 and signature facsimile 22 of the individual customer to whom the check was issued with the appearance and signature of the transferor in deciding whether or not to accept the check.

An outline 29 of the predetermined form and area in which the customer identifying information appears on each traveler's check of the illustrated embodiment is shown in FIG. 2. In this embodiment, the representation of the customer's portrait and signature are located at 20a and 22a, respectively. In addition, the entered account number is located at 24a and the issue date at 26a. Obviously, however, the size and location of the representative portrait and signature, the entered account number and the issue date may vary without departing from the scope of the present invention as defined in the appended claims. It is only preferable that the customer identifying information appear in some consistent form and area on each traveler's check 10 to facilitate acceptance of the checks in the business community.

A preferred system for dispensing to bank customers the traveler's checks of the present invention would include the main elements shown in FIG. 3. A representation of the portrait and signature of a bank customer is produced by an identification imaging apparatus 30. This representation for each customer is then stored in digitized form in a central computer 32 under an account number assigned to the bank customer. Requests for checks are entered, and if approved, issued through a traveler's check dispenser 34.

These main elements of the preferred dispensing system may be discussed with reference to a detailed block diagram of the system shown in FIG. 4. As illustrated, the identification imaging apparatus 30 includes an imaging system 40 and a console 42 through which customer identifying information is entered and compiled into a contoured mask similar in form to the outline 29 shown in FIG. 2. The compiled identifying information includes the representation of the customer's portrait and signature and the customer's assigned account number, which as already noted in the case of joint accounts, can include an identifying suffix. This information is digitized for transmission and storage purposes by being passed through a digital translator 44. The resulting digital signal is then sent via transmitter 46 to a receiver 50 in the central computer 32. The control computer 52 of the central computer 32 takes this digital signal from the receiver 50 and stores it in customer data storage 54 under the individual's assigned account number. Customer data storage 54 may alternatively be a storage unit independent from, but in communication with, the central computer 32.

A customer will preferably request traveler's checks by giving a bank teller his account number, or a bank account identification card, and a desired monetary amount of checks. The bank teller will then enter the account number and the desired monetary amount into the dispenser 34 via console 64. Based upon the account owner identifying information appearing on any resultantly issued checks, the bank teller will be able; to confirm or question the customer's identity and thereby ensure the integrity of the system. Automatic traveler's check dispensers which enable the customer to enter his account number, a desired monetary amount and a secret identification number may also be provided.

It is contemplated that the traveler's checks of the present invention may be purchased by an account owner and paid for either by withdrawal from his account or possibly by check or cash. In the case of an automatic dispenser, payment would preferably be by withdrawal from the customer's account. The mechanics of how these various payment methods are recorded will be discussed below.

Assuming that the requested traveler's checks are to be credited against the customer's account balance, then the entered information is transferred by transmitter 68 in dispenser 34 to receiver 50 in the central computer 32. Alternatively, should the customer prefer to pay by check or cash for the requested traveler's checks then only the account number will be transferred to the central computer 32 for verification. Upon receipt of the transferred information, the control computer 52 will verify that the entered account number is one of assigned account numbers and if it is, it will send an accept signal to the transmitter 58. After verifying the entered account number, if a withdrawal is to be made from the account to pay for the requested checks, the control computer 52 will compare the desired monetary amount of traveler's checks with the account balance. If the desired amount may be validly withdrawn from the account, an issue signal will also be sent to transmitter 58. Alternatively, if the amount may not be validly withdrawn from the account, an insufficient funds signal may be sent to transmitter 58. From transmitter 58 the accept and issue signals, are returned to the internal computer 62 of the dispenser 34 through receiver 60. If payment is to be by check or cash, the teller will make the determination whether or not to issue the requested traveler's checks.

Upon receipt of the accept and issue signals, internal computer 62 requests from central computer 32 the digital signal stored under the entered account number in customer data storage 54. This signal is transmitted to dispenser 34 where it is passed through a decoder and image regenerator 63 which recreates the contoured mask containing the representative portrait and signature of the account owner and the entered account number or its coded equivalent. The issue date is inserted into the contoured mask by the internal computer 62 with reference to an internal timing clock. The mask is then transferred to printer/dispensers 66 for printing on blank traveler's checks preprinted with a serial number and issuing bank identification in denominations as determined by the internal computer 62 and discussed in detail below.

The individual bank customer who desires to obtain traveler's checks must initially enter into the dispensing system the appropriate identifying information to be printed on said checks. This information is inputted through the identification imaging apparatus 30 and, as already noted, stored in digital form under the customer's account number in the central computer. It is contemplated that there will be one identification imaging apparatus 30 in each branch of a bank issuing the traveler's checks of the present invention.

A top plan view of one embodiment of the identification imaging apparatus 30 is shown in FIG. 5. The individual account owner 70 is positioned in front of a video lens 72 for the taking of a still picture with the aid of hood 74. In the preferred embodiment, the individual 70 will be able to observe his appearance through a CRT display 76 located above video lens 72. The individual's portrait may alternatively be entered by providing for insertion into the identification imaging apparatus 30 of an existing photograph of the customer for scanning. The individual may enter his signature by signing signature card 78 and placing it in slot 80. An account number may be entered via console 42. Once entered, this information is optically conveyed so as to properly appear on a masked contour similar to that discussed earlier. The information is subsequently digitized and transferred via communications line 84 to the central computer 32 for storage .

A process diagram showing the operational steps implemented by the identification imaging apparatus 30 is shown in FIG. 6. Initially, identification imaging apparatus 30 optically scans the customer's signature (step 90) on the signature card 78, obtains a video image (step 92) of the customer, and receives an account number (step 94) entered by the customer. As noted, this information is optically conveyed so as to properly appear as a contoured mask (step 96). A half-tone image of the contoured mask is then taken (step 98), which in turn is transformed into a digital signal (step 100). Finally, the resulting digital signal is transmitted (step 102) to the central computer for filing in the customer data storage 54 under the entered account number.

The traveler's check dispenser 34 may be described in greater detail with reference to the block diagram shown in FIG. 7. As discussed earlier, a customer enters via console 64 an account number and a desired monetary amount of traveler's checks. The entered account number is compared with assigned account numbers, and depending upon the method of payment, the desired monetary amount may be compared with the monetary balance present in the entered account number. If the comparison (comparisons) is (are) favorable the traveler's check dispenser 34 will issue the checks.

Upon receipt of an accept signal and, if applicable, an issue signal, internal computer 62 of the traveler's check dispenser 34 will request from the central computer 32 the digital signal stored in customer data storage 54 under the entered account number. This digital signal is transferred to dispenser 34 where a decoder and reconstructer 63 recreates the contoured mask containing the customer identifying information.

In the preferred embodiment of the present invention, traveler's checks of different denominations may issue from a single traveler's check dispenser 34. For example, in FIG. 7, four printer/dispensers 66a, 66b, 66c, 66d are shown. The printers will preferably incorporate an electrostatic printing process, well known in the printing art. Alternative printing processes may involve ink jet devices and photographic methods.

Each printer/dispenser may hold checks of a different preprinted denomination. For example, printer/dispenser #I, 66a, may hold checks of $20 denomination while the other printer/dispensers, 66b, 66c, 66d may hold checks of $50, $100 and $500 denomination. The issuing bank will choose the most desirable dispensable denominations in light of its own experience.

The internal computer 62 will determine the denomination and number of each traveler's check to be dispensed by printer/dispensers 66a, 66b, 66c and 66d with reference to the desired monetary amount. In the preferred embodiment, internal computer 62 will be programmed to automatically issue the requested amount. It is contemplated that the dispenser 34 will be able to simultaneously print and dispense checks of different denominations. For example, a request for $1360 will preferably simultaneously operate all four printer/dispensers twice and the $20 printer/dispenser alone once more, yielding two $500, two $100, two $50 and three $20 checks. Additionally, the internal computer 62 may be programmed to generally provide the customer with a choice as to which denominations are to be dispensed. Of course, there would necessarily have to be practical limits on the customer's ability to so choose. For example, it would be impractical to allow a customer desiring $2200 in checks to receive one hundred and ten checks of #20 denomination.

A process diagram showing the operational steps implemented by the traveler's check dispenser 34 after the issuance of a check (checks) has (have) been approved as discussed above is shown in FIG. 8. The digital signal filed under the entered account number is obtained from the customer data storage 54, as indicated in step 114, decoded and regenerated (step 116) into the representative customer identifying information and transferred to each printer/dispenser to be activated. Simultaneous with the decoding and regenerating operation (step 116) of the representative image, blank traveler's checks are fed (step 118) from a hopper into the printer/dispensers in denominations and numbers determined by the internal computer 62. The representative customer identifying information is then printed (step 120) on said blank checks. The printer/dispensers will also read the serial number of each printed check (step 122) and, along with the account number and monetary amount dispensed, will transfer (step 124) this information to the central computer for recordation in account data storage 56. The transaction will eventually appear on the customer's monthly statement. (In addition, it is contemplated that the issuing bank will be able to obtain, as a result of the computer recordation of this information, up to date summations of the size of its outstanding traveler's check "float".) If payment was by cash or check this information would appear as a "zero" withdrawal in the account data storage 56 and the customer's monthly statement. Lastly, printed traveler's checks are cut, if supplied in roll or accordion form, and dispensed (step 126).

Preferably, the bank teller will examine the dispensed checks for any imperfections before giving them to the customer. Should a traveler's check issued by dispenser 34 be improperly printed or have the wrong customer identifying information printed thereon, it may be voided by insertion into a void mechanism 110 present on each dispenser 34.

As indicated in the process diagram illustrated in FIG. 9, a traveler's check to be voided is fed (step 130) into a void slot. The serial and account number of the traveler's check are read (step 132), and as noted earlier, the serial number will preferably contain the denomination value as a part thereof. This information is then transferred (step 134) to the central computer and credited as a void in the account data storage 56 under the read account number. The traveler's check will be mechanically punched with the word "void" (step 136) and outputted (step 138).

Figure 10:
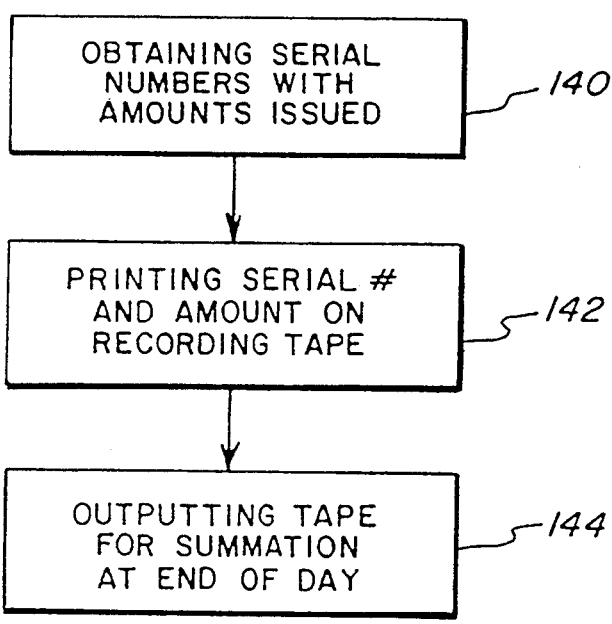
FIG. 10 is a block diagram of the steps implemented by the recording tape assembly shown in FIG. 7.

Lastly, as indicated in FIG. 7, it is contemplated that each dispenser will have a recording tape assembly 112 which will give a daily summation of the checks dispensed therefrom. As shown in FIG. 10 the process steps involve obtaining the serial numbers and denominations of issued traveler's checks (step 140) from the internal computer 62 and then printing this information on recording tape (step 142) and outputting the tape (step 144) for the teller's daily summation.

Figure 11:
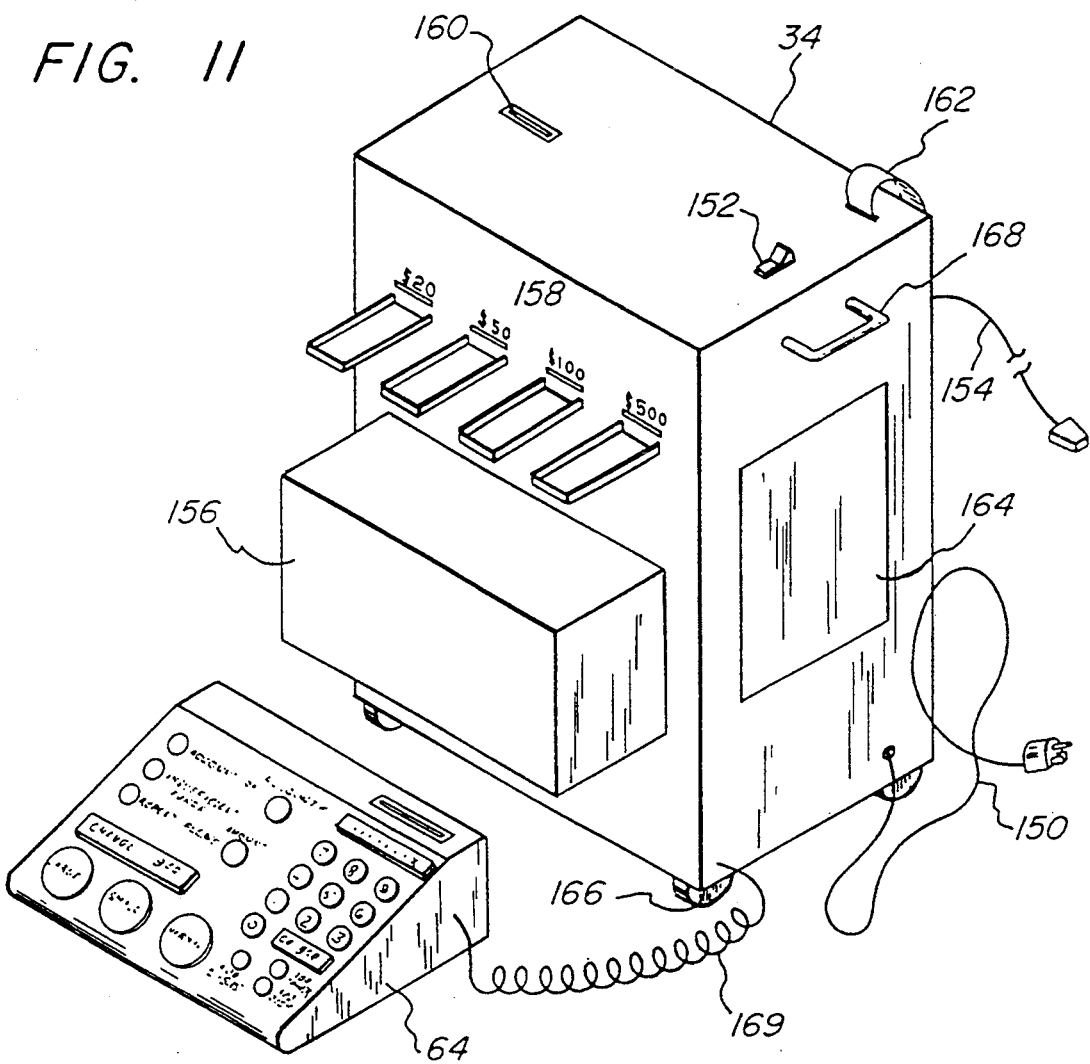
FIG. 11 is a perspective view of a traveler's check dispenser.

The external appearance of one embodiment of a traveler's check dispenser 34 is shown in FIG. 11. Preferably, there will be a number of traveler's check dispensers in each bank branch to facilitate the timely issuance of checks to multiple customers. In the embodiment shown, power cord 150 and power on/off switch 152 are provided. It is contemplated that the dispenser will run off standard outlet power. Communication with the central bank computer 32 is accomplished via data line 154. Blank traveler's checks to be dispensed may be stored in rolls in a hopper 156. Traveler's checks of various denominations are outputted through parallel dispensing slots 158. A slot 160 for the void mechanism 110 and the daily recording tape 162 discussed above are also shown. printer/dispenser service panel 164 will allow for internal access to the dispenser in case repair or maintenance is needed. Additionally, the dispenser may have coasters 166 and a handle 168 for ease of movement. Lastly, a table top console 64 is shown linked to the dispenser 34 via communications line 169.

Figure 12:
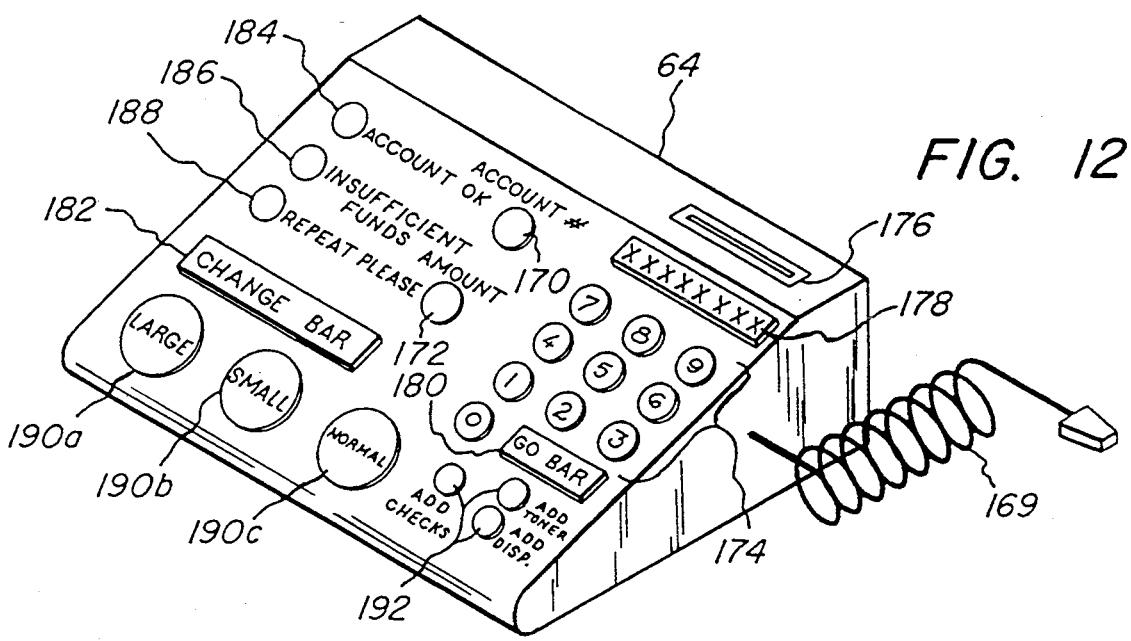
FIG. 12 is an enlarged perspective view of the check dispenser console shown in FIG. 11.

Tabletop console 64 is more clearly shown in FIG. 12. An account number may be entered by first pressing button 170 and then the appropriate numbers on keypad 174. Alternatively, a card slot 176 into which a customer may place a bank account card may be provided. The desired monetary amount may similarly be entered by first pressing button 172 and then the appropriate numbers on keypad 174. As the account number and monetary amount are being entered via keypad 174 the amount and number will preferably show on display 178. If the information entered is correct, the teller presses bar 180 which will transfer the information to the internal computer 62 of the dispenser 34. Should the teller incorrectly type in an account number or a desired monetary amount the entry may be cancelled via "cancel" bar 182.

As discussed above, the entered account number will be compared with assigned account numbers stored in the central computer. If the comparison is favorable, an accept signal will energize an "account OK" light 184. When payment is requested to be by withdrawal from the customer's account and a comparison of the desired monetary amount with the balance is negative, an "insufficient funds" light 186 will be activated. A "repeat please" light 188 will preferably be activated when the entered account number was not found among assigned account numbers or when entered information is lost in transmission.

As noted earlier, in the preferred embodiment the customer will be provided with a means for generally selecting desired denominations of traveler's checks. On the console embodiment 64 shown, this may be accomplished by requesting that the teller press button 190a for large denomination checks, button 190b for small denomination checks or button 190c for a denomination mixture of traveler's checks. The traveler's check dispenser may be programmed so that when the "normal" button 190c is pressed, checks in an amount equivalent to the desired monetary amount will be outputted in the most time efficient manner. Additionally, in default of making a particular selection, the dispenser 34 may be programmed to function as if the "normal" button 190c had been pressed.

A service needed indicator panel may also be provided. In the embodiment shown, this panel is located on console 64. Examples of typical indicator lights would include "add checks" "add toner", and "add dispersant" 192.

It will be noted that this invention fully meets the objectives set forth. A traveler's check is provided which will positively identify on its face the individual owner of the account number under which the check is issued. Further, a dispensing system is provided which will quickly and efficiently dispense traveler's checks of various denominations, totalling a monetary amount validly requested by a bank customer. Lastly, it will be observed that the universally recognizable traveler's check of the present invention will allow small and medium size banking institutions to partake in the business of issuing traveler's checks.

As will be clear to those skilled in the imaging, computer recording and printing arts there are a plurality of presently available technical means for implementing the specific functions of the main elements comprising the above described traveler's check dispensing system. For example, the identification imaging apparatus may incorporate a digital image processor of the type manufactured by Vicom Systems, Inc. of San Jose, Calif.

Although one embodiment has been illustrated in the accompanying drawing and described in the foregoing description, it will be understood that the invention is not limited to the embodiment discussed but is capable of numerous rearrangements, modification and substitutions without departing from the scope of the invention. For example, the predetermined area and form within which the representative customer identifying information is printed may vary. Also, the identification imaging apparatus may incorporate alternative digitizing techniques to the presently preferred approach described earlier. Other changes, within the scope of the invention as defined by the appended claims, will suggest themselves to those skilled in this art.

I claim:

1. A system for dispensing traveler's checks which identify on their face the individual owner of the account number under which the checks are issued, comprising:
   means for prerecording and storing under an account number a representation of the portrait and signature of an individual assigned said account number;
   means for storing blank traveler's checks, each of said checks being preprinted with a serial number and issuing bank identification;
   means for an individual user of the system to enter a desired monetary amount of traveler's checks and an account number;
   means for comparing said entered account number with assigned account numbers to generate an accept signal when the comparison is favorable;
   means for printing on said blank traveler's checks in the desired monetary amount said representation of the portrait and signature stored under said entered account number; and for dispensing the so printed traveler's checks in the desired monetary amount, said printing and dispensing means being responsive to said accept signal; and
   means for recording and storing the serial numbers of the checks dispensed, the entered account number and the date of issuance of said checks.

2. The system of claim 1, further comprising means for charging said desired monetary amount against the balance for the entered account number and further comprising:
   means for comparing said desired monetary amount with the monetary balance for said entered account number to generate an issue signal when the associated comparison is favorable; and
   said printing and dispensing means being responsive to said issue signal.

3. The system of claim 2, wherein the stored blank traveler's checks are of preprinted denominations.

4. The system of claim 3, wherein the denomination of each blank check is included in each check's serial number and wherein the means for recording and storing includes means for recording and storing the denominations of dispensed checks.

5. The system of claim 4, further comprising means for selecting denominations of traveler's checks to be printed and dispensed, and in default of making said selection, for printing and dispensing said traveler's checks so as to minimize printing and dispensing time.

6. The system of claim 5, further comprising means for limiting the number of traveler's checks of a particular denomination which may be issued at one time.

7. The system of claim 2, wherein said printing means includes means for printing the entered account number and the issue date on said blank traveler's checks.

8. The system of claim 7, wherein said printing means includes means for printing the representation of the portrait and signature stored under said entered account number, the entered account number and the issue date on each check in a consistent, predetermined form and area.

9. The system of claim 8, further comprising means for voiding dispensed defective traveler's checks and for crediting in the amount voided the account number under which the checks were issued.

10. The system of claim 9, further comprising means for providing a daily summation of dispensed traveler's checks including the denomination of each check and the account number under which each check was dispensed.

11. A system for dispensing traveler's checks which identify on their face the individual owner of the account number under which the checks are issued, comprising:
   identification image means for recording a representation. of the portrait and signature of an individual assigned an account number;
   dispensing means including means for a user of the system to enter a desired monetary amount of traveler's checks and an account number, means for printing on stored blank traveler's checks in the desired monetary amount the entered account number and the representation of the portrait and signature of the individual assigned the entered account number, each of said checks being preprinted with a serial number and issuing bank identification, and means for dispensing the so printed traveler's checks in the desired monetary amount, the printing and dispensing means being responsive to an accept signal; and
   central computer means connected to said identification image means and said dispensing means, said central computer means including means for storing under an account number the representation of the portrait and signature of the individual assigned said account number, means for comparing the entered account number with assigned account numbers to generate an accept signal when the comparison is favorable, and means for recording and storing the amount and serial numbers of checks dispensed, the entered account number and the date of issuance of said checks.

12. The system of claim 11, further comprising:

means for charging said monetary amount against the balance for the entered account number;

means for comparing said desired monetary amount with the monetary balance for said entered account number to generate an issue signal when the associated comparison is favorable; and said dispensing means being responsive to said issue signal.

13. The system of claim 12, wherein the stored blank traveler's checks are of preprinted denominations.

14. The system of claim 12, further comprising a plurality of dispensing means connected to said central computer means.

15. The system of claim 13, wherein said dispensing means includes means for voiding dispensed defective traveler's checks and for crediting in an amount voided the account number under which the checks were issued.

16. A method of issuing traveler's checks of preprinted denominations from a terminal, which traveler's checks identify on their face the individual owner of the account number under which the checks are issued comprising the steps of:

identifying an account number and a desired monetary amount of traveler's checks;

verifying that the identified account number is one of assigned account numbers;

determining from the desired monetary amount the quantity of stored blank traveler's checks of particular preprinted denominations to be dispensed;

printing on said quantity of traveler's checks a representation of the portrait and signature of the individual who is assigned the identified account number, and the identified account number, each of said checks being preprinted with a serial number and issuing bank identification; and dispensing from said terminal said traveler's checks.

17. The method of claim 16 further including the step of recording and storing the serial number and denomination of each check dispensed, the identified account number and the date of issuance of said checks.

18. The method of claim 17 further including the steps of:

verifying that the desired monetary amount may be validly withdrawn from the identified account number; and charging said monetary amount of traveler's check against the balance for the identified account number.

* * * * *